US011095545B2

(12) United States Patent
Chen et al.

(10) Patent No.: US 11,095,545 B2
(45) Date of Patent: Aug. 17, 2021

(54) CONTROL PACKET MANAGEMENT

(71) Applicant: VMware, Inc., Palo Alto, CA (US)

(72) Inventors: Haoran Chen, Beijing (CN); Xiaoyan Jin, Beijing (CN); Ming Shu, Beijing (CN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/660,458

(22) Filed: Oct. 22, 2019

(65) Prior Publication Data

US 2021/0119897 A1 Apr. 22, 2021

(51) Int. Cl.
| | |
|---|---|
| H04L 12/28 | (2006.01) |
| H04L 12/26 | (2006.01) |
| H04L 12/24 | (2006.01) |
| H04L 12/46 | (2006.01) |
| H04L 12/741 | (2013.01) |

(52) U.S. Cl.
CPC ...... *H04L 43/0888* (2013.01); *H04L 12/4633* (2013.01); *H04L 41/22* (2013.01); *H04L 43/0817* (2013.01); *H04L 43/0894* (2013.01); *H04L 45/74* (2013.01)

(58) Field of Classification Search
CPC . H04L 12/4641; H04L 12/46; H04L 41/0893; G06F 9/455; G06F 9/45533; G06F 2009/45587
See application file for complete search history.

(56) References Cited

U.S. PATENT DOCUMENTS

| | | |
|---|---|---|
| 5,550,816 A | 8/1996 | Hardwick et al. |
| 5,949,757 A | 9/1999 | Katoh et al. |
| 6,111,876 A | 8/2000 | Frantz et al. |
| 6,219,699 B1 | 4/2001 | McCloghrie et al. |
| 6,487,183 B1 | 11/2002 | Lo et al. |
| 6,512,745 B1 | 1/2003 | Abe et al. |
| 6,963,585 B1 | 11/2005 | Pennec et al. |
| 7,013,342 B2 | 3/2006 | Riddle |
| 7,046,630 B2 | 5/2006 | Abe et al. |

(Continued)

FOREIGN PATENT DOCUMENTS

WO 2010041996 A1 4/2010

OTHER PUBLICATIONS

Davie, B., et al., "A Stateless Transport Tunneling Protocol for Network Virtualization (STT)," draft-davie-stt-01, Mar. 5, 2012, 19 pages, IETF.

(Continued)

*Primary Examiner* — Chirag R Patel
(74) *Attorney, Agent, or Firm* — Adeli LLP

(57) ABSTRACT

Some embodiments provide a method for managing control packet usage within a physical network that implements a plurality of logical networks. The method receives a tunnel monitoring configuration for a logical network. The configuration specifies control packet usage for logical datapaths between logical ports of the logical network. The method maps the logical datapaths to tunnels between host computers that host data compute nodes (DCNs) corresponding to the logical ports. Based on the mappings, the method configures control packet modules executing on the host computers to generate control packets for monitoring the tunnels based on the specified control packet usage.

24 Claims, 7 Drawing Sheets

(56) References Cited

U.S. PATENT DOCUMENTS

| | | | |
|---|---|---|---|
| 7,379,465 B2 | 5/2008 | Aysan et al. | |
| 7,561,527 B1 | 7/2009 | Katz et al. | |
| 7,606,229 B1 | 10/2009 | Foschiano et al. | |
| 7,606,260 B2 | 10/2009 | Oguchi et al. | |
| 7,643,488 B2 | 1/2010 | Khanna et al. | |
| 7,668,104 B1 | 2/2010 | Pannell et al. | |
| 7,792,987 B1 | 9/2010 | Vohra et al. | |
| 7,808,919 B2 | 10/2010 | Nadeau et al. | |
| 7,826,482 B1 | 11/2010 | Minei et al. | |
| 7,937,438 B1 | 5/2011 | Miller et al. | |
| 7,974,202 B2 | 7/2011 | Solomon | |
| 8,031,633 B2 | 10/2011 | Bueno et al. | |
| 8,055,789 B2 | 11/2011 | Richardson et al. | |
| 8,146,148 B2 | 3/2012 | Cheriton | |
| 8,224,971 B1 | 7/2012 | Miller et al. | |
| 8,259,571 B1 | 9/2012 | Raphel et al. | |
| 8,312,129 B1 | 11/2012 | Miller et al. | |
| 8,351,418 B2 | 1/2013 | Zhao et al. | |
| 8,611,352 B2 | 12/2013 | Mizrahi et al. | |
| 8,625,616 B2 | 1/2014 | Vobbilisetty et al. | |
| 8,644,188 B1 | 2/2014 | Brandwine et al. | |
| 8,825,900 B1 | 9/2014 | Gross et al. | |
| 9,485,185 B2 | 11/2016 | Jackson et al. | |
| 9,565,056 B2* | 2/2017 | Davison | H04L 41/0668 |
| 9,667,556 B2 | 5/2017 | Jackson et al. | |
| 10,484,289 B2 | 11/2019 | Jackson et al. | |
| 10,630,581 B2* | 4/2020 | Paul | H04L 45/38 |
| 2004/0015750 A1 | 1/2004 | Obuchi et al. | |
| 2004/0097232 A1 | 5/2004 | Haverinen | |
| 2004/0213298 A1 | 10/2004 | Sato | |
| 2005/0053079 A1 | 3/2005 | Havala | |
| 2006/0002370 A1 | 1/2006 | Rabie et al. | |
| 2006/0026225 A1 | 2/2006 | Canali et al. | |
| 2006/0171350 A1 | 8/2006 | Taniguchi et al. | |
| 2006/0193266 A1 | 8/2006 | Siddha et al. | |
| 2006/0245438 A1 | 11/2006 | Sajassi et al. | |
| 2007/0098006 A1 | 5/2007 | Parry et al. | |
| 2007/0106922 A1 | 5/2007 | Obuchi et al. | |
| 2007/0130366 A1 | 6/2007 | O'Connell et al. | |
| 2007/0280243 A1 | 12/2007 | Wray et al. | |
| 2007/0280277 A1 | 12/2007 | Lund et al. | |
| 2007/0286137 A1 | 12/2007 | Narasimhan et al. | |
| 2008/0025249 A1 | 1/2008 | Kuppuswamy et al. | |
| 2008/0031263 A1 | 2/2008 | Ervin et al. | |
| 2008/0198858 A1 | 8/2008 | Townsley et al. | |
| 2008/0285452 A1 | 11/2008 | Oran | |
| 2008/0285463 A1 | 11/2008 | Oran | |
| 2008/0291910 A1 | 11/2008 | Tadimeti et al. | |
| 2008/0291927 A1 | 11/2008 | Yong et al. | |
| 2009/0116381 A1 | 5/2009 | Kanda | |
| 2009/0141729 A1 | 6/2009 | Fan | |
| 2010/0098092 A1 | 4/2010 | Luo et al. | |
| 2010/0254385 A1 | 10/2010 | Sharma et al. | |
| 2010/0311429 A1 | 12/2010 | Baker et al. | |
| 2011/0211449 A1 | 9/2011 | Attar et al. | |
| 2011/0261812 A1 | 10/2011 | Kini et al. | |
| 2011/0299402 A1 | 12/2011 | Vobbilisetty et al. | |
| 2012/0131643 A1 | 5/2012 | Cheriton | |
| 2013/0138830 A1 | 5/2013 | Fang | |
| 2013/0322453 A1* | 12/2013 | Allan | H04L 12/4662 370/395.53 |
| 2015/0085655 A1 | 3/2015 | Jackson et al. | |
| 2015/0089048 A1 | 3/2015 | Jackson et al. | |
| 2015/0100560 A1* | 4/2015 | Davie | H04L 45/14 707/703 |
| 2017/0331750 A1 | 11/2017 | Jackson et al. | |
| 2018/0123827 A1* | 5/2018 | Josyula | H04L 12/4641 |

OTHER PUBLICATIONS

Farinacci, D., et al., "Generic Routing Encapsulation (GRE)," Mar. 2000, pp. 1-9, The Internet Society (RFC 2784).

Koponen, Teemu, et al., "Network Virtualization in Multi-tenant Datacenters," Technical Report TR-2013-001E, Aug. 2013, 22 pages, VMware, Inc., Palo Alto, CA, USA.

Mahalingham, Mallik, et al., "VXLAN: A Framework for Overlaying Virtualized Layer 2 Networks over Layer 3 Networks," draft-mahalingham-dutt-dcops-vxlan-00.txt Internet Draft, Aug. 26, 2011, 20 pages, Internet Engineering Task Force.

Pfaff, Ben, et al., "The Open vSwitch Database Management Protocol," draft-pfaff-ovsdb-proto-00, Aug. 20, 2012, 34 pages, Nicira, Inc., Palo Alto, California, USA.

Sridharan, M., et al., "NVGRE: Network Virtualization using Generic Routing Encapsulation; draft-sridharan-virtualization-nvgr-02.txt," Feb. 25, 2013, 17 pages, Internet Engineering Task Force.

* cited by examiner

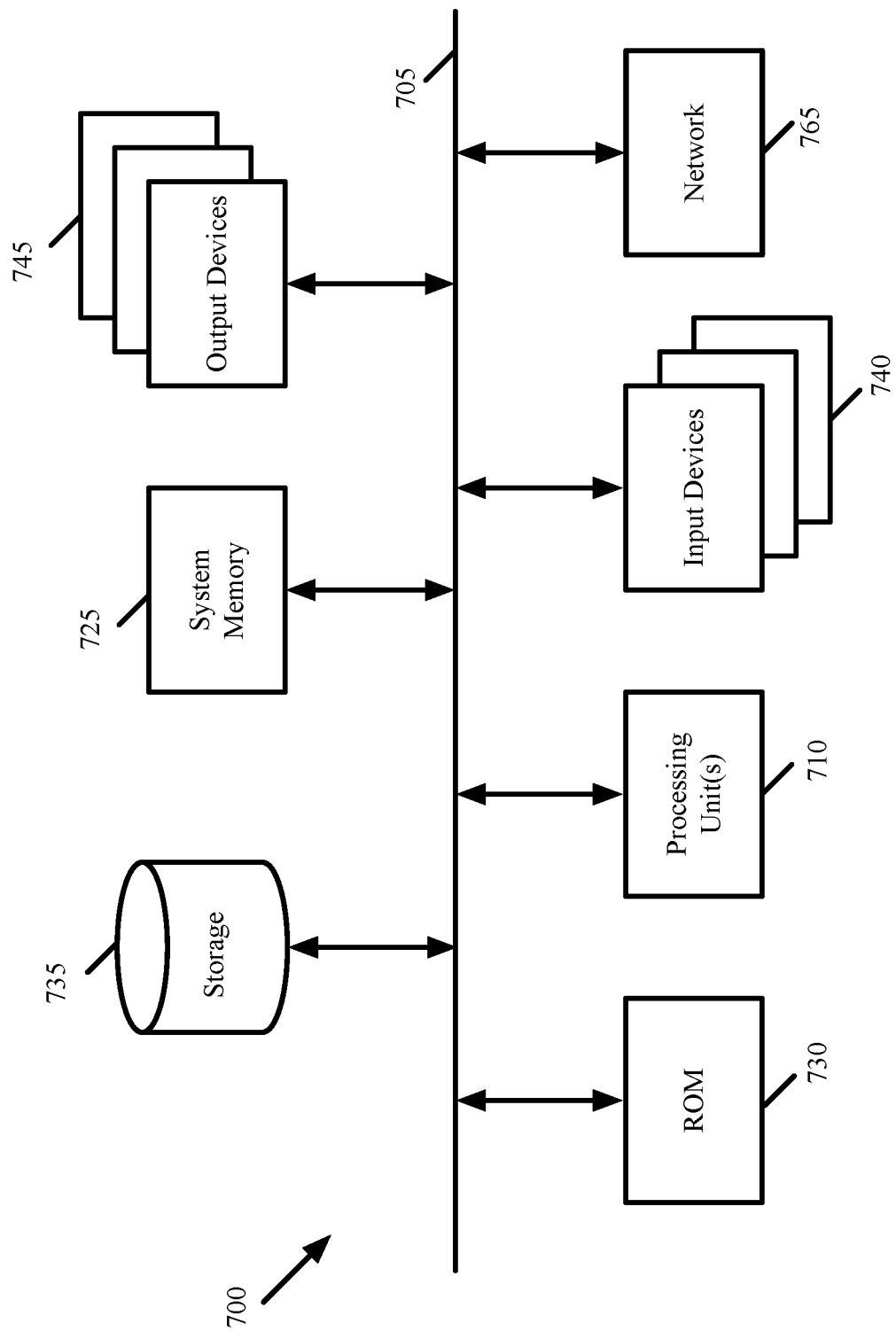

CONTROL PACKET MANAGEMENT

BACKGROUND

Within a datacenter, BFD packets are commonly used to detect tunnel status between two tunnel endpoints. While important, these BFD packets (or other control packets) consume bandwidth and processing resources that could otherwise be used for production traffic (e.g., between virtual machines). In addition, as datacenters scale out to more and more hypervisors, the number of tunnels (and thus the amount of BFD packets) scales exponentially. Thus, as these networks grow larger, the control packets can noticeably impact the production traffic in the datacenter. As such, techniques are needed to better manage these control packets.

BRIEF SUMMARY

Some embodiments provide a method for a network manager (or network controller) to manage control packet usage within a physical network (e.g., a datacenter). The network manager receives monitoring configuration data, for one or more logical networks implemented in the physical network, that specifies control packet usage for logical datapaths between logical ports of the logical network. The network manager maps these logical datapaths to tunnels between host computers that host data compute nodes (DCNs) corresponding to the logical ports and, based on the mappings, configures control packet modules that execute on the host computers to generate control packets (e.g., Bidirectional Forwarding Detection (BFD) packets) for monitoring the tunnels based on the specified control packet usage.

In some embodiments, the monitoring configuration may be received from a user (e.g., a network administrator) through a user interface. The user interface in some embodiments enables the user to specify one of a plurality of options (e.g., high, medium, low, none, etc.) for the control packet usage for each of the logical datapaths. In different embodiments, a control packet usage option may be specified for all datapaths involving a particular logical port or ports, all datapaths between logical ports on a particular logical switch or set of logical switches, etc. In some embodiments, the specified control packet usage for each logical datapath indicates a minimum required rate for the control packets to be generated and exchanged across the tunnel to which the logical datapath is mapped.

In some embodiments, the network manager maps each logical datapath between two logical ports to a tunnel by identifying the host computers that host DCNs (e.g., virtual machines, containers, physical devices, etc.) corresponding to the logical ports. Each of the host computers in the network includes at least one tunnel endpoint, and the logical datapath is mapped to a tunnel between the tunnel endpoints on the identified host computers. When a single logical datapath is mapped to a tunnel, that tunnel inherits the control packet rate specified for the logical datapath. In certain cases, logical ports correspond to DCNs that execute on the same host computer, in which case no tunnel between the logical ports is needed.

In some embodiments, two or more logical datapaths may be mapped to the same tunnel (e.g., because the DCNs corresponding to the logical ports of the logical datapaths execute on the same pair of host computers). In this case, the network manager performs tunnel deduplication in some embodiments so that only a single control packet rate is specified for the tunnel. In some embodiments, the network manager selects the highest control packet rate specified for the two or more logical datapaths mapped to the tunnel to be used for monitoring the tunnel. By selecting the highest specified control packet rate for monitoring the tunnel, the control packet rates specified for each of the logical datapaths mapped to the tunnel are effectively honored, while also eliminating unnecessary control packet generation and exchanges. It should be noted that the network manager performs tunnel deduplication across logical datapaths for multiple logical networks, in some embodiments, as these multiple logical networks share the underlay physical network.

In some embodiments, the network manager may receive modifications to the logical network that affect the configuration of the control packet modules. Such modifications may include addition of a new logical port to the logical network, removal of a logical port, a direct modification to the tunnel monitoring configuration, etc. If the change results in a new tunnel (e.g., because two host computers now correspond to the logical ports of a logical datapath) or a change in the highest specified control packet rate for a tunnel (e.g., because a new logical port corresponding to a DCN on a particular host computer requires a higher control packet rate for its logical datapaths than any logical ports previously associated with the particular host computer), the network manager updates the tunnel monitoring configuration and configures the control packet modules of the requisite host computers. In addition, if a DCN corresponding to a particular logical port migrates from a first host computer to a second host computer migrates, the network manager may need to update the control packet rates for tunnels between (i) the first host computer and other host computers and (ii) the second host computer and other host computers.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

FIG. 7 conceptually illustrates an electronic system with which some embodiments of the invention are implemented.

DETAILED DESCRIPTION OF THE INVENTION

In the following detailed description of the invention, numerous details, examples, and embodiments of the invention are set forth and described. However, it should be understood that the invention is not limited to the embodiments set forth and that the invention may be practiced without some of the specific details and examples discussed.

Some embodiments provide a method for a network manager (or network controller) to manage control packet usage within a physical network (e.g., a datacenter). The network manager receives monitoring configuration data, for one or more logical networks implemented in the physical network, that specifies control packet usage for logical datapaths between logical ports of the logical network. The network manager maps these logical datapaths to tunnels between host computers that host data compute nodes (DCNs) corresponding to the logical ports and, based on the mappings, configures control packet modules that execute on the host computers to generate control packets (e.g., Bidirectional Forwarding Detection (BFD) packets) for monitoring the tunnels based on the specified control packet usage.

Figure 1:
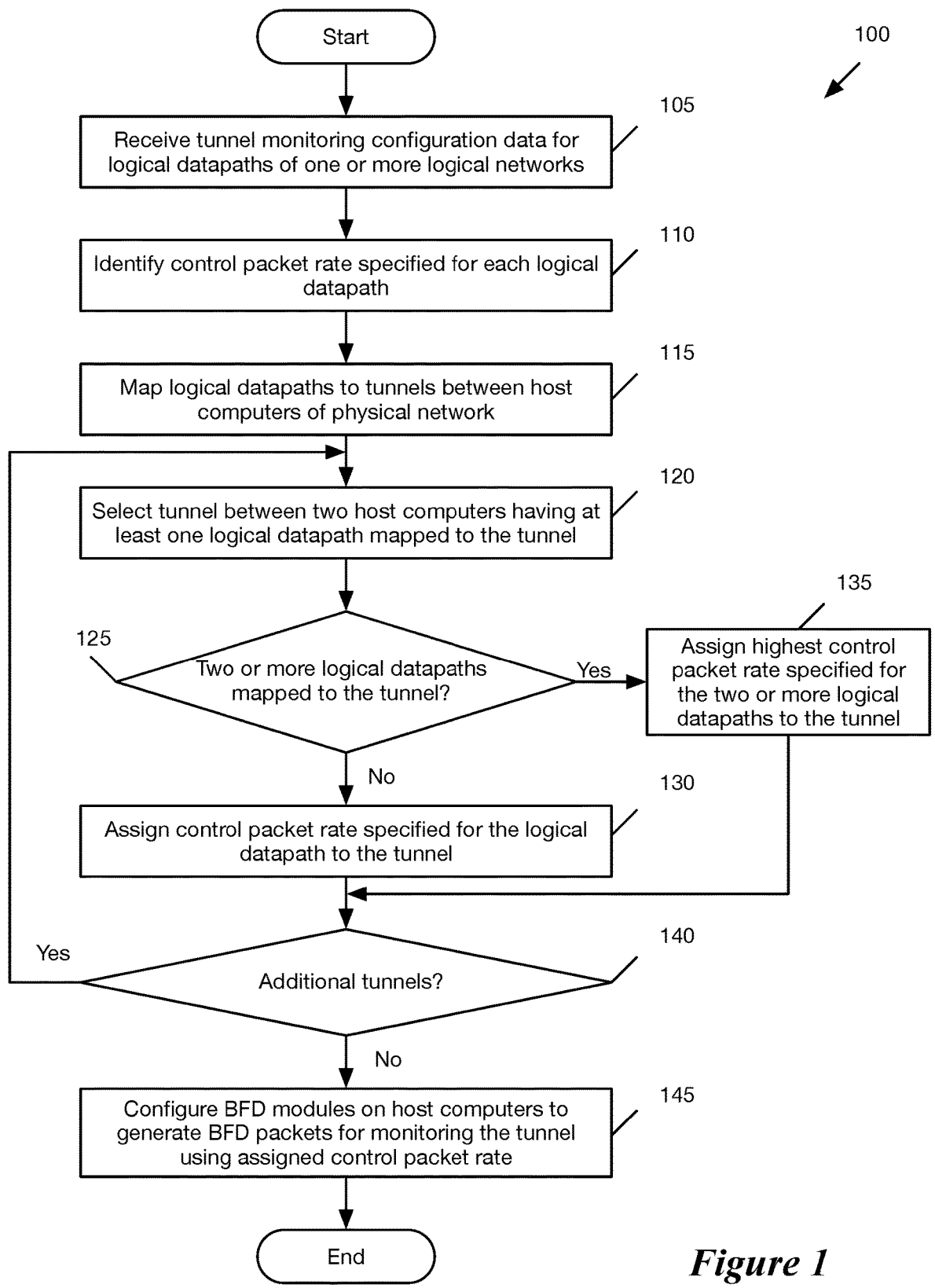
FIG. 1 conceptually illustrates a process of some embodiments to manage control packet usage within a physical network.

FIG. 1 conceptually illustrates a process 100 of some embodiments to manage control packet usage within a physical network (e.g., a datacenter). The process 100 is performed by a network manager or network controller (e.g., a management plane or centralized control plane application) in some embodiments, based on tunnel monitoring configuration data received from one or more users (e.g., network administrators of logical networks).

As shown, the process 100 begins by receiving (at 105) tunnel monitoring configuration data for one or more logical networks implemented in the physical network. In some embodiments, the configuration data for each logical network is received from a network administrator via an interface of the management plane application (e.g., an application programming interface (API)). In some embodiments, the administrator communicates with the management plane application directly (e.g., via a command line interface, via a user interface provided directly by the management plane application) or via a datacenter management program that provides a user interface and translates user inputs into API commands.

The tunnel monitoring configuration data received for a particular logical network specifies control packet usage (e.g., a control packet rate) for logical datapaths between logical ports of the particular logical network. In some embodiments, the administrator for the logical network may specify in the tunnel monitoring configuration data a particular set of logical datapaths to be monitored. In some embodiments, the user interface enables the user to specify one of a plurality of options (e.g., high, medium, low, none, etc.) for the control packet usage for each of the logical datapaths. In different embodiments, a control packet usage option may be specified for the datapaths in various different manners. For instance, a network administrator could specify a particular control packet usage option for all logical datapaths involving a particular logical port or ports (e.g., all datapaths between a selected logical port and any other logical port in the logical network or on the same logical switch as the selected logical port). As another option, a network administrator could assign a particular control packet usage option for all logical datapaths between all logical ports on a particular logical switch. Along these lines, the administrator could select a first option for logical datapaths between the logical ports of a first logical switch, a second option for logical datapaths between the logical ports of a second logical switch, and a third option for logical datapaths from a logical port on the first logical switch to a logical port on the second logical switch. An administrator could also individually select a control packet usage option for specific logical datapaths and/or manually specify a control packet rate for certain logical datapaths as well, in some embodiments.

The process 100 identifies (at 110) a minimum control packet rate specified for each logical datapath. In some embodiments, the specified control packet usage for each logical datapath indicates a minimum required rate for the control packets to be generated and exchanged across the tunnel to which the logical datapath is mapped. For instance, in some embodiments, a user may specify a control packet usage of "high" for a particular datapath (e.g., a datapath of high importance), which would indicate that control packets should be generated and exchanged at least at a rate that corresponds to the "high" option (e.g., every 10000 microseconds) for the particular datapath. In some other embodiments, a user may specify a control packet usage of "none" for the particular datapath (e.g., a datapath of low importance that can be ignored), which would indicate no control packets should be generated for the logical datapath.

Next, the process 100 maps (at 115) each logical datapath between two logical ports to a tunnel in the physical network by identifying the host computers that host data compute nodes (DCNs), such as virtual machines (VMs), corresponding to the logical ports. That is, each logical port, in some embodiments, corresponds to a VM, container, bare metal computer, etc. For pairs of logical ports corresponding to a VM, container, or other type of DCN hosted on a host computer, the logical datapaths between these ports are mapped to a tunnel between the two host computers. Each of the host computers in the network includes at least one tunnel endpoint (e.g., a VTEP that is part of or associated with a managed forwarding element (MFE) executing on the host computer), and the logical datapath is mapped to a tunnel between the tunnel endpoints on the identified host computers. Two logical ports of a logical datapath may correspond to VMs that execute on the same host computer in some embodiments, in which case no tunnel is used between the logical ports (and thus no tunnel monitoring control packets are required).

Once each of the logical datapaths is mapped to a tunnel, the process 100 performs any deduplication required so that a single control packet rate is assigned to each tunnel (in a typical physical network, many of the tunnels will have multiple logical datapaths mapped to one tunnel, and only a single control packet rate is needed for each tunnel). That is, when the VMs corresponding to the logical ports of two different logical datapaths execute on the same pair of host computers, these logical datapaths may be mapped to the same tunnel. The process 100 selects (at 120) a tunnel between two host computers to which at least one logical datapath is mapped.

Accordingly, the process 100 determines (at 125) whether two or more logical datapaths are mapped to the selected tunnel. In some embodiments, when two or more logical datapaths are mapped to the same tunnel, the network manager performs tunnel deduplication so that only one control packet rate is assigned to the tunnel.

If only one logical datapath is mapped to the tunnel, then the process 100 assigns (at 130) the control packet rate specified for that single logical datapath to the tunnel (i.e., the control packet rate specified for the logical datapath is inherited by the tunnel). On the other hand, if more than one logical datapath is mapped to the tunnel, the process 100 assigns (at 135) the highest control packet rate specified for any of those logical datapaths to the tunnel. By selecting the highest specified control packet rate for monitoring the tunnel, the control packet rates specified for each of the logical datapaths mapped to the tunnel are effectively honored, while also eliminating unnecessary (i.e., duplicative) control packet generation and exchanges.

After assigning a control packet rate to the tunnel, the process 100 determines (at 140) whether additional tunnels to which at least one logical datapath is mapped remain without an assigned control packet rate. When additional tunnels remain, the process returns to 120 to select the next tunnel to which at least one datapath is mapped.

Otherwise, the process configures (at 145) control packet modules executing on the host computers to generate control packets for monitoring the tunnel using the assigned control packet rates. The process then ends. In some embodiments, in addition to an MFE, each host also executes a control packet module that is responsible for generating and sending control packets for each tunnel for which the host computer is an endpoint, as well as processing control packets received over those tunnels. For instance, some embodiments use Bidirectional Forwarding Detection (BFD) for tunnel monitoring, and a BFD agent executes on each of the host computers. For each tunnel, in some embodiments, the management plane identifies the control packet rate and provides this control packet rate as configuration data to the BFD agents at each endpoint of the tunnel. As described below by reference to FIG. 6, some embodiments provide this data via a network control system including central and local controllers.

It should be understood that, in some embodiments, the process 100 (or portions of the process 100) are not only performed at the time a network is initially setup. In a typical datacenter, logical networks will be created, removed, and/or modified every so often, and within the physical network VMs may be migrated (thus effectively migrating a logical port). As such, the control packet rate assignment process is performed for at least a subset of affected tunnels with each such change to the network.

Figure 2:
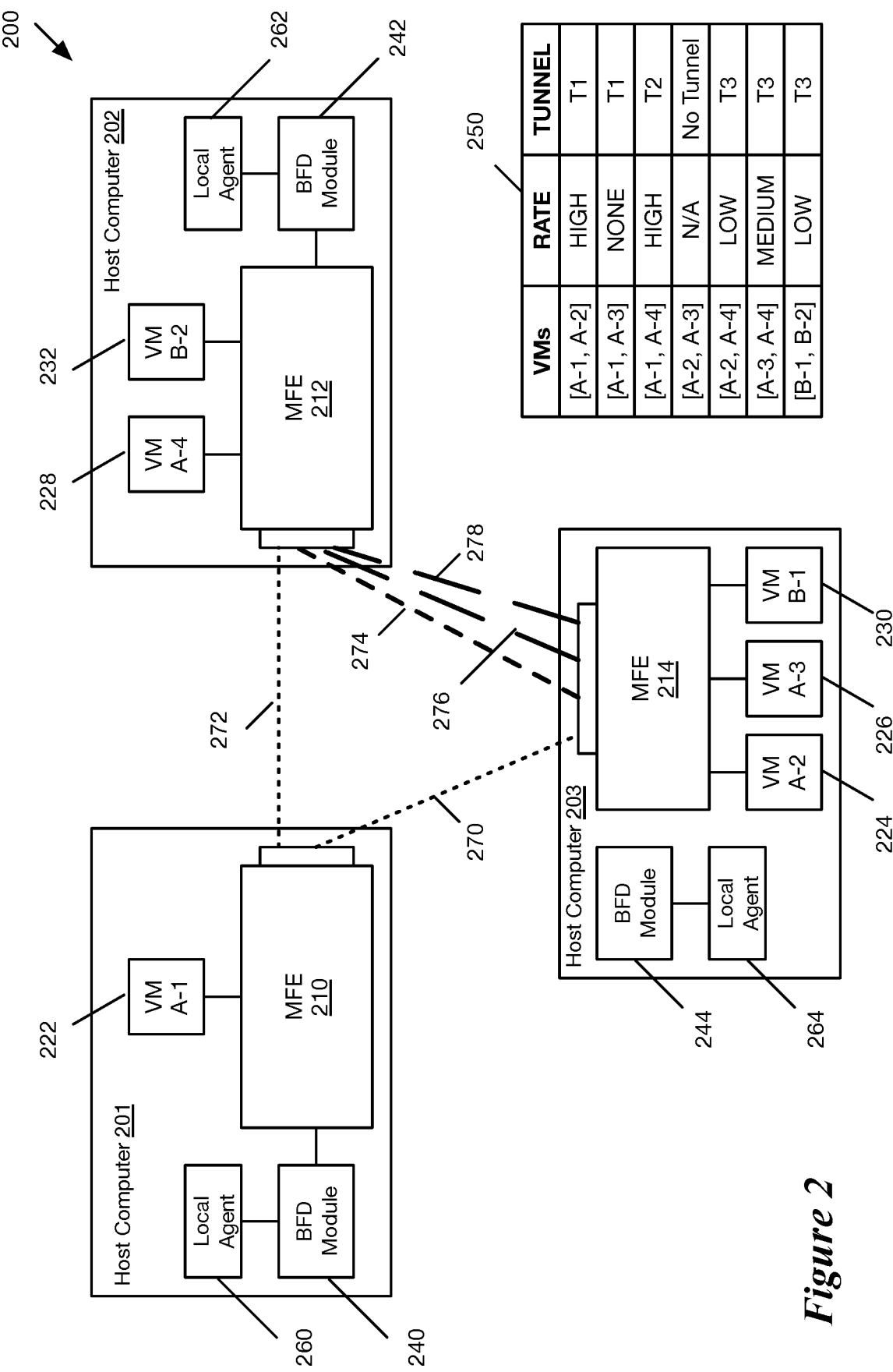
FIG. 2 conceptually illustrates an example of the mapping of logical datapaths in a network in some embodiments.

FIG. 2 conceptually illustrates an example of the mapping of logical datapaths 270-278 to tunnels in a physical network 200 of some embodiments. In this example, two different logical networks (e.g., logical network A and logical network B) are implemented in the physical network 200. While this particular example includes two different logical networks implemented in the physical network, it should be noted that any number of different logical networks may be implemented in the physical network. As shown, the network includes a set of host computers 201-203 that each execute at least one VM, an MFE (e.g., MFEs 210-214), a BFD module (e.g., BFD modules 240-244), and a local agent (e.g., local agents 260-264). In some embodiments, the MFEs, BFD modules, and local agents execute within virtualization software (e.g., a hypervisor) executed by the host machines.

The local agents 260-264 receive monitoring configuration data from a network control system (not shown) and configure the BFD modules 240-244 to generate control packets for monitoring the tunnels based on this configuration data. As shown, each of the BFD modules 240-244 also connect to the MFEs 210-214 in order to exchange the generated control packets through the tunnels. The BFD modules 240-244 and local agents 260-264 will be described in more detail below.

As shown, host computer 201 hosts VM A-1 belonging to logical network A, host computer 202 executes VM A-4 belonging to logical network A and VM B-2 belonging to logical network B, and host computer 203 executes VMs A-2 and A-3 belonging to logical network A and VM B-1 belonging to logical network B. Each of the VMs connects to the MFE 210-214 executing on its corresponding host computer, via which the VM sends and receives data packets with the other VMs in the logical network or with endpoints external to the logical network.

FIG. 2 also depicts a table 250 that includes (i) sets of VMs that correspond to logical datapaths 270-278 of logical networks A and B, (ii) specified control packet rates for each logical datapath, and (iii) the tunnel to which each logical datapath is mapped. For example, the logical datapath 270 between VM A-1 and VM A-2 is mapped to tunnel T1 and has a specified minimum control packet rate of HIGH indicating a high rate of control packet generation and exchange (e.g., every 10000 microseconds), whereas the logical datapath 276 between VM B-1 and VM B-2 is mapped to tunnel T3 and has a specified minimum control packet rate of LOW (e.g., every 100000 microseconds) indicating a low rate of control packet generation and exchange.

As mentioned above, when two or more logical datapaths are mapped to the same tunnel, the network manager of some embodiments performs tunnel deduplication so that only a single control packet rate is specified for the tunnel. Additionally, in some embodiments, logical datapaths for multiple logical networks may be mapped to the same tunnel in some embodiments. In this example, logical datapaths 274 and 276 for logical network A and logical datapath 278 for logical network B are all mapped to the same tunnel, tunnel T3.

Figure 3:
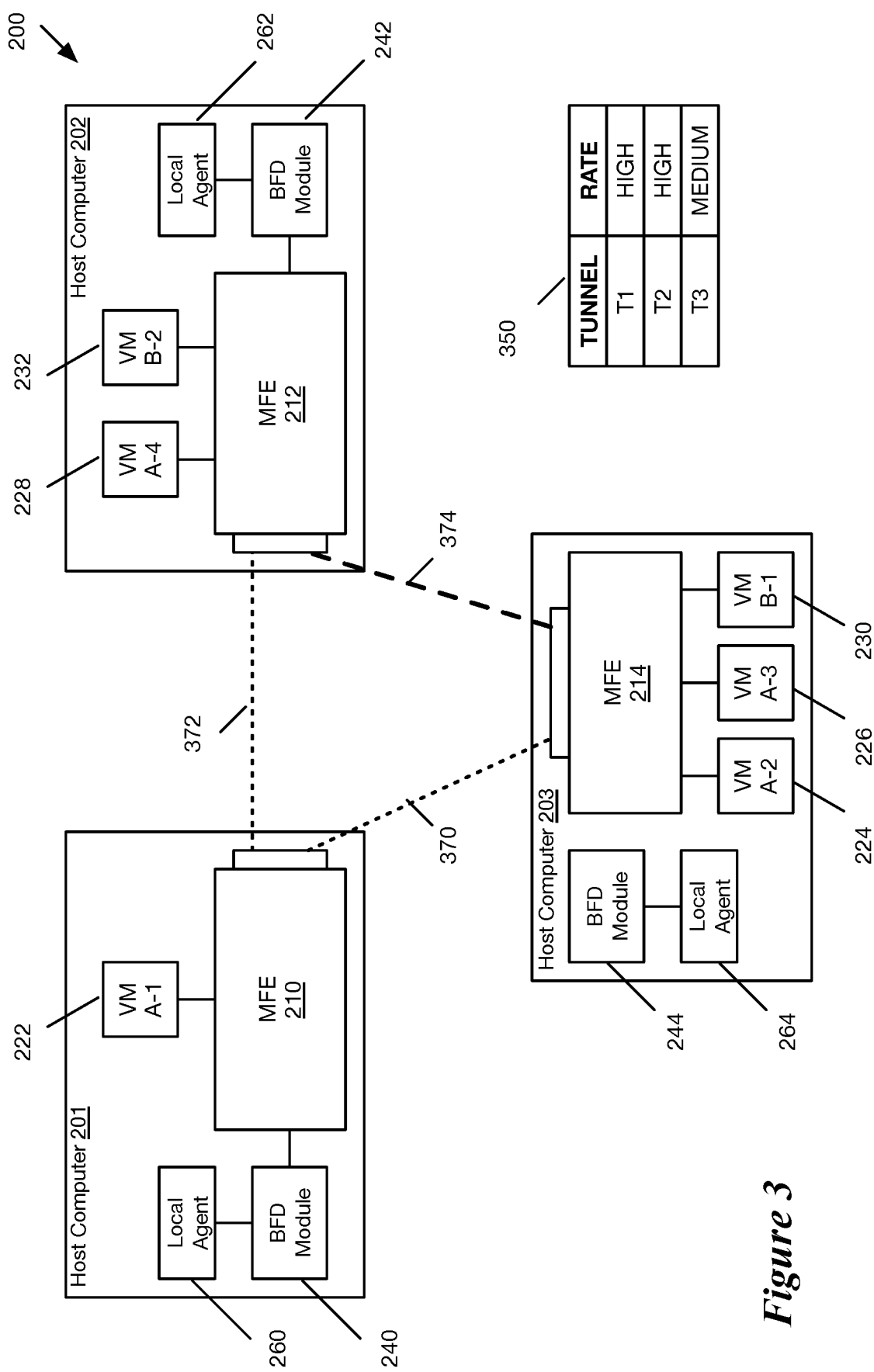
FIG. 3 conceptually illustrates a resolution of tunnel deduplication in the network of FIG. 2 in some embodiments.

Prior to configuring the BFD modules 240-244, the network manager performs tunnel deduplication for each of the tunnels to which two or more logical datapaths mapped. In the tunnel deduplication process, the network manager selects the highest control packet rate specified for the two or more logical datapaths mapped to the tunnel. The purpose of selecting the highest control packet rate is to assure that each of the specified control packet rates are honored. For example, using a control packet rate of MEDIUM (e.g., every 500000 microseconds) would effectively honor a control packet rate of LOW as the control packet rate at the medium setting would be greater than the minimum control packet rate required for a LOW setting. Similar principles hold when the control packet rates are not discrete options, but rather manually input control packet rates (e.g., if one logical datapath requires control packets every 50000 microseconds and another logical datapath requires control packets every 55000 microseconds, then generating and sending control packets every 50000 microseconds will honor both of these requirements. Additionally, by eliminating the generation and exchange of unnecessary and duplicative control packets, network resources (e.g., bandwidth) and computational resources to generate and process the packets are not wasted. FIG. 3 conceptually illustrates the network 200 after the network manager has performed tunnel deduplication and configured the tunnels with the selected and assigned control packet rates in some embodiments.

As illustrated in FIG. 2, the logical datapath 276 between VM A-2 and VM A-3 and the logical datapath 278 between VM B-1 and VM B-2 each has a specified control packet rate of LOW (as illustrated by the long dashes and indicated in the table 250), while the logical datapath 274 between VM A-3 and VM A-4 has a specified control packet rate of MEDIUM (as illustrated by the short dashes and indicated in the table 250).

As each of these logical datapaths 274-278 is mapped to the same tunnel, T3, the network manager performs tunnel deduplication. In this case, the control packet rate of MEDIUM would be selected as the highest control packet rate specified for the logical datapaths and would therefore be assigned to the tunnel T3, as illustrated in FIG. 3 by tunnel 374 having the same dashed line as logical datapath 274. Table 350 additionally indicates a rate of MEDIUM for tunnel T3. As the logical datapath between VMs A-1 and A-3 has a specified rate of NONE, tunnel T1 inherits the control packet rate specified for logical datapath 270 between VMs A-1 and A2. Similarly, tunnel T2 inherits the control packet rate specified for logical datapath 272 between VMs A-1 and A-4, as no other logical datapaths are mapped to the tunnel.

In some embodiments, changes may be made to the logical network(s) and/or physical network. For example, VMs may be migrated from one host computer to another host computer, VMs may be removed completely, new VMs may be introduced, VMs may be added to host computers that did not previously host VMs (i.e., resulting in a new tunnel between host computers), etc. In each of these cases, new or modified monitoring configuration data, re-mapping of logical datapaths, and/or reassigning of control packet rates may be required to account for the changes. Such a use case is described below.

Figure 4:
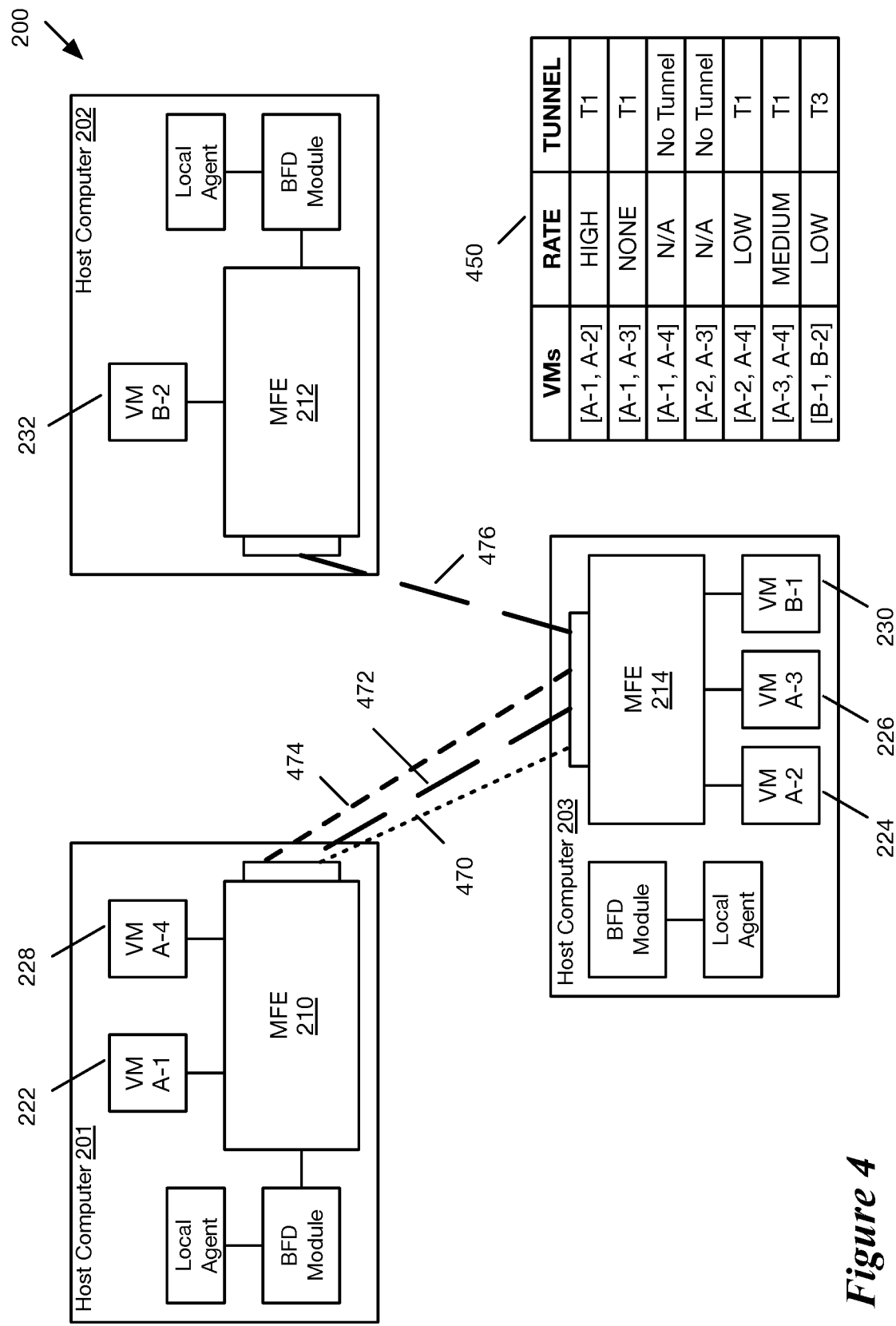
FIG. 4 conceptually illustrates a migration of a VM from one host computer to another host computer in the network of FIG. 2 in some embodiments.

FIG. 4 conceptually illustrates the migration of VM A-4 from host computer 202 to host computer 201 in network 200. As shown, the logical datapath mappings have changed as a result of the VM migration. In this case, three different logical datapaths 470-474, each having a different control packet rate, are mapped to the same tunnel T1, while no logical datapaths are mapped to tunnel T2 and a single logical datapath 476 is mapped to tunnel T3. As a result, new control packet rates will need to be assigned to tunnels T2 and T3 and tunnel deduplication will need to be performed on tunnel T1.

Figure 5:
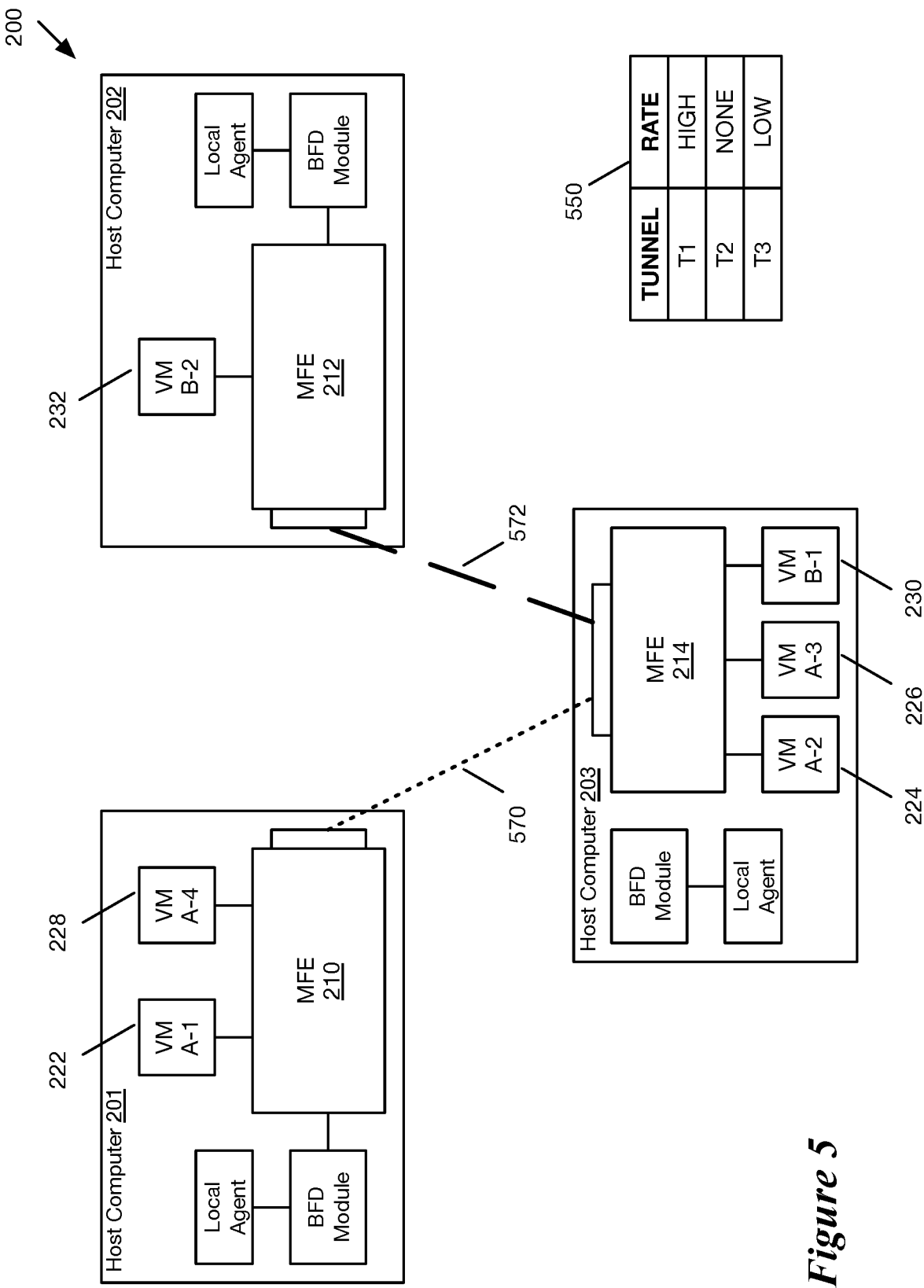
FIG. 5 conceptually illustrates a resolution of tunnel deduplication following the VM migration of FIG. 4 in some embodiments.

FIG. 5 illustrates such an example resolution of tunnel deduplication and the new control packet rates for each of the tunnels. As shown, tunnel T1 again has an assigned control packet rate of HIGH (shown by dotted line 570). The assigned control packet rate for tunnel T2 has been changed from HIGH to NONE as a result of the migration of VM A-4 from host computer 202 to host computer 201, as both of the VMs A-1 and A-4 on host computer 201 belong to logical network A while the VM 232 on host computer 202 belongs to logical network B, meaning no logical datapaths exist between these VMs. Lastly, the assigned control packet rate for tunnel T3 has changed from MEDIUM to LOW (shown by dashed line 573) as there is only one logical datapath (e.g., as illustrated by logical datapath 476 in FIG. 4), the control packet rate of which is then inherited by the tunnel.

As mentioned above, FIG. 6 conceptually illustrates a network control system 600 of some embodiments and the delivery of configuration data to the BFD modules executing on the host computers. The network control system 600 includes a network controller/manager 630 as well as local agents 660-662 on each of the host computers. The network controller/manager 630 represents the centralized portion of the network control system 600. In different embodiments, this could include a network manager, network controller, or both. For instance, some embodiments include a management plane (e.g., one or more network managers) that receives configuration input and generates the configuration data to be distributed to the local agents as well as a central control plane (e.g., one or more network controllers) that receives configuration data from the management plane, identifies the host computers that require each piece of configuration data, and distributes this configuration data to the correct set of local agents.

In some embodiments, the network manager/controller 630 receives data for configuring the logical networks to be implemented in the physical network (e.g., defining the logical routers and logical switches as well as the logical ports of these logical forwarding elements) as well as monitoring configuration data for these logical networks. The network manager/controller 630 generates logical network configuration data and provides this to the local agents 660-662, which use this data to configure the MFEs 610-612. Though shown as a single MFE on each host computer, it should be understood that this represents a set of one or more MFEs on each host computer (e.g., one or more virtual switches, virtual routers, etc.) that implement the logical network.

Figure 6:
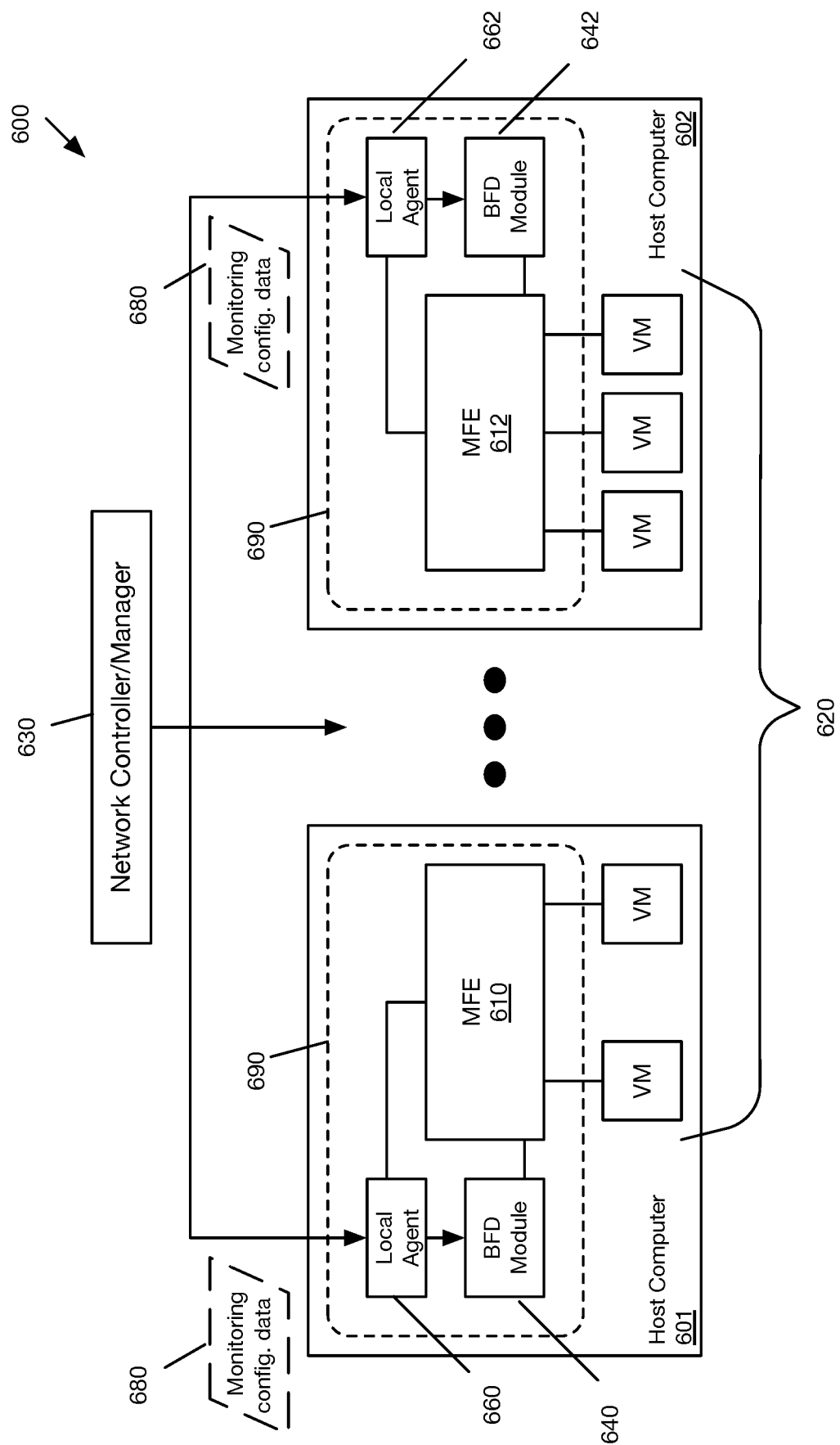
FIG. 6 conceptually illustrates a network management system of some embodiments.

As described above, the network manager/controller 630 also identifies the control packet rate for each tunnel between host computers in the physical network that corresponds to at least one logical datapath. As shown in FIG. 6, the network manager/controller 630 provides this generated monitoring configuration data 680 to local agents 660-662 operating on the host computers 601-602. In some embodiments, a network manager sends the monitoring configuration data 680 to a central control plane, which identifies the host computer(s) for each piece of data and provides that data to the appropriate local agents 660-662. For instance, a particular BFD module 640 will be provided control packet rate configuration data for each tunnel between its host computer 601 and the other host computers of the physical network.

After receiving the monitoring configuration data 680 from the network manager 630, the local agents 660-662 use the monitoring configuration data 680 to configure the control packet modules (BFD modules) 640-642. These BFD modules generate and exchange control packets (e.g., BFD packets) according to the assigned control packet rates in the monitoring configuration data 680 specified for each of the tunnels between the host computers 601-602. That is, for each tunnel between its corresponding host computer 601 and another host computer of the physical network, the BFD module 640 generates and sends BFD packets at the rate specified for that tunnel. In addition, the BFD module receives and processes BFD packets transmitted by the corresponding BFD modules on the other host computers.

To send the BFD packets used to monitor the tunnels (i.e., to verify that the tunnels remain up), in some embodiments the BFD modules 640-642 generate BFD packets at the specified rate and send them out via the MFEs 610-612. In some embodiments, the BFD packets are generated using the source and destination IP addresses of the corresponding virtual tunnel endpoints of the host computers. Though described in this application as having a single VTEP per host computer, in some embodiments some or all of the host computers may have multiple VTEPs. In this case, separate tunnels may be established between each VTEP on a first host computer and multiple VTEPs on other computers. For example, between a first host computer with two VTEPs and a second host computer with three VTEPs, up to six tunnels could be established, for which six separate control packet rates might be assigned. In some embodiments, logical ports are mapped to specific VTEPs based on a teaming policy implemented for the network. In some such embodiments, each of the VTEPs may correspond to a particular uplink having a 1×1 binding with a PNIC (physical network interface card).

FIG. 7 conceptually illustrates an electronic system 700 with which some embodiments of the invention are implemented. The electronic system 700 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 700 includes a bus 705, processing unit(s) 710, a system memory 725, a read-only memory 730, a permanent storage device 735, input devices 740, and output devices 745.

The bus 705 collectively represents all system, peripheral, and chipset buses that communicatively connect the numerous internal devices of the electronic system 700. For instance, the bus 705 communicatively connects the processing unit(s) 710 with the read-only memory 730, the system memory 725, and the permanent storage device 735.

From these various memory units, the processing unit(s) 710 retrieve instructions to execute and data to process in order to execute the processes of the invention. The processing unit(s) may be a single processor or a multi-core processor in different embodiments.

The read-only-memory (ROM) 730 stores static data and instructions that are needed by the processing unit(s) 710 and other modules of the electronic system. The permanent storage device 735, on the other hand, is a read-and-write memory device. This device is a non-volatile memory unit that stores instructions and data even when the electronic system 700 is off. Some embodiments of the invention use a mass-storage device (such as a magnetic or optical disk and its corresponding disk drive) as the permanent storage device 735.

Other embodiments use a removable storage device (such as a floppy disk, flash drive, etc.) as the permanent storage device. Like the permanent storage device 735, the system memory 725 is a read-and-write memory device. However, unlike storage device 735, the system memory is a volatile read-and-write memory, such a random-access memory. The system memory stores some of the instructions and data that the processor needs at runtime. In some embodiments, the invention's processes are stored in the system memory 725, the permanent storage device 735, and/or the read-only memory 730. From these various memory units, the processing unit(s) 710 retrieve instructions to execute and data to process in order to execute the processes of some embodiments.

The bus 705 also connects to the input and output devices 740 and 745. The input devices enable the user to communicate information and select commands to the electronic system. The input devices 740 include alphanumeric keyboards and pointing devices (also called "cursor control devices"). The output devices 745 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 7, bus 705 also couples electronic system 700 to a network 765 through a network adapter (not shown). In this manner, the computer can be a part of a network of computers (such as a local area network ("LAN"), a wide area network ("WAN"), or an Intranet, or a network of networks, such as the Internet. Any or all components of electronic system 700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given may be any type of DCNs, including physical hosts, VMs, non-VM containers, and hypervisor kernel network interface modules. In fact, the example networks might include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIG. 1) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

The invention claimed is:

1. A method for managing control packet usage within a physical network that implements a plurality of logical networks, the method comprising:
   receiving a tunnel monitoring configuration for a logical network, the configuration specifying control packet usage for logical datapaths between logical ports of the logical network;
   mapping the logical datapaths and control packet usage to tunnels between host computers that host data compute nodes (DCNs) corresponding to the logical ports; and
   based on the mappings, configuring control packet modules executing on the host computers to generate control packets for monitoring the tunnels based on the specified control packet usage.

2. The method of claim 1, wherein the specified control packet usage for a particular logical datapath between a first logical port that corresponds to a first host computer and a second logical port that corresponds to a second host computer defines a rate at which control packet modules executing on the first and second host computers generate control packets for monitoring the tunnel between the first and second host computers.

3. The method of claim 2, wherein the control packet modules executing on the first and second host computers exchange the generated control packets via the tunnel in order to monitor the tunnel.

4. The method of claim 3, wherein the defined rate is a minimum required rate for the control packet modules executing on the first and second host computers to generate and exchange control packets via the tunnel.

5. The method of claim 1, wherein the tunnel monitoring configuration is received from a network administrator through a user interface.

6. The method of claim 5, wherein the user interface enables the network administrator to specify one of a plurality of options for the control packet usage for each logical datapath of the logical network.

7. The method of claim 6, wherein each of the different options for a particular logical datapath specifies a different minimum required rate for control packet exchange on the tunnel to which the particular logical datapath is mapped.

8. The method of claim 1, wherein mapping the logical datapaths to tunnels between host computers comprises:
   for a particular logical datapath between a first logical port and a second logical port, identifying (i) a first host computer to which the first logical port corresponds and (ii) a second host computer to which the second logical port corresponds; and
   mapping the particular logical datapath to a tunnel between a tunnel endpoint associated with the first host computer and a tunnel endpoint associated with the second host computer.

9. The method of claim 1, wherein two or more logical datapaths are mapped to a same tunnel between a first host computer and a second host computer, the first logical datapath having a first specified control packet usage and the second logical datapath having a second specified control packet usage.

10. The method of claim 9 further comprising, when the first control packet usage is different than the second control packet usage, selecting one of the first and second control packet usages for the tunnel.

11. The method of claim 10, wherein the first and second control packet usages specify different first and second rates at which the control packet modules are configured to generate control packets for monitoring the tunnel between the first host computer and the second host computer, wherein the selected rate is the higher rate for generating the control packets.

12. The method of claim 1, wherein:
   the logical a network is a first logical network;
   a first logical datapath of the first logical network and a second logical datapath of a second logical network are mapped to a same particular tunnel between first and second host computers; and
   a first control packet usage is specified for the first logical datapath and a second control packet usage is specified for the second logical datapath.

13. The method of claim 12 further comprising selecting one of the first and second control packet usages for the particular tunnel, wherein the control packet modules executing on the first and second host computers are configured to generate control packets for monitoring the tunnel based on the selected control packet usage.

14. The method of claim 1 further comprising:
   receiving (i) a modification to the logical network that adds a new logical port to the logical network, wherein the new logical port corresponds to a DCN hosted on a particular host computer that did not previously host any of the DCNs of the logical network, and (ii) a modification to the tunnel monitoring configuration, the modification specifying control packet usage for new logical datapaths between the new logical port and other logical ports of the logical network;

mapping the new logical datapaths to tunnels between the particular host computer and other host computers of the physical network; and configuring a control packet module executing on the particular host computer to generate control packets for monitoring the tunnels between the particular host computer and the other host computers based on the specified control packet usage.

15. The method of claim 1, wherein the DCN corresponding to a particular logical port is migrated from a first host computer to a second host computer, the method further comprising:

remapping logical datapaths between the particular logical port and other logical ports of the logical network to a different set of tunnels between the second host computer and other host computers of the physical network; and based on the remapping, configuring the control packet modules executing on the second host computer and the other host computers to generate control packets for monitoring the set of tunnels based on the specified control packet usage.

16. A non-transitory machine readable medium storing a program which when executed by at least one processing unit manages control packet usage within a physical network that implements a plurality of logical networks, the program comprising sets of instructions for:

receiving a tunnel monitoring configuration for a logical network, the tunnel monitoring configuration specifying, for each logical datapath of a plurality of logical datapaths between logical ports of the logical network, a control packet usage for the logical datapath;

mapping each particular logical datapath of the plurality of logical datapaths and the control packet usage for the particular logical datapath to a respective tunnel between host computers that host data compute nodes (DCNs) corresponding to the logical ports, wherein at least two logical datapaths with two different specified control packet usages are mapped to a same particular tunnel; and for each respective tunnel between a respective set of host computers, configuring control packet modules executing on the respective set of host computers to generate control packets for monitoring the tunnel based on the specified control packet usage for the logical datapaths mapped to the tunnel.

17. The non-transitory machine readable medium of claim 16, wherein the specified control packet usage for a particular logical datapath between a first logical port that corresponds to a first host computer and a second logical port that corresponds to a second host computer defines a rate at which control packet modules executing on the first and second host computers generate control packets for monitoring a tunnel between the first and second host computers.

18. The non-transitory machine readable medium of claim 17, wherein:

the control packet modules executing on the first and second host computers exchange the generated control packets via the tunnel in order to monitor the tunnel; and the defined rate is a minimum required rate for the control packet modules executing on the first and second host computers to generate and exchange control packets via the tunnel.

19. The non-transitory machine readable medium of claim 16, wherein:

the tunnel monitoring configuration is received from a network administrator through a user interface;

the user interface enables the network administrator to specify one of a plurality of options for the control packet usage for each logical datapath of the logical network; and each of the plurality of options for a particular logical datapath specifies a different minimum required rate for control packet exchange on the tunnel to which the particular logical datapath is mapped.

20. The non-transitory machine readable medium of claim 16, wherein the set of instructions for mapping each particular logical datapath of the plurality of logical datapaths to a respective tunnel between host computers comprises sets of instructions for:

for a particular logical datapath between a first logical port and a second logical port, identifying (i) a first host computer to which the first logical port corresponds and (ii) a second host computer to which the second logical port corresponds; and mapping the particular logical datapath to a tunnel between a tunnel endpoint associated with the first host computer and a tunnel endpoint associated with the second host computer.

21. The non-transitory machine readable medium of claim 16, wherein the same particular tunnel to which the at least two logical datapaths with two different specified control packet usages are mapped comprises a tunnel between a first host computer and a second host computer.

22. The non-transitory machine readable medium of claim 21, wherein:

the two different specified control packet usages specify different first and second rates at which the control packet modules are configured to generate control packets for monitoring the tunnel between the first host computer and the second host computer; and the program further comprises a set of instructions for selecting one of the first and second control packet usages having a higher rate for generating control packets for the tunnel.

23. The non-transitory machine readable medium of claim 16, wherein:

the logical a network is a first logical network;

a first logical datapath of the first logical network and a second logical datapath of a second logical network are mapped to a same particular tunnel between first and second host computers; and a first control packet usage is specified for the first logical datapath and a second control packet usage is specified for the second logical datapath.

24. The non-transitory machine readable medium of claim 23, wherein the program further comprises a set of instructions for selecting one of the first and second control packet usages for the particular tunnel, wherein the control packet modules executing on the first and second host computers are configured to generate control packets for monitoring the tunnel based on the selected control packet usage.

* * * * *